US008888477B2

(12) United States Patent
Hirokane et al.

(10) Patent No.: US 8,888,477 B2
(45) Date of Patent: Nov. 18, 2014

(54) MOLDED PRODUCT PRODUCTION DEVICE

(75) Inventors: Daisuke Hirokane, Tokyo (JP); Akiharu Satoh, Tokyo (JP); Masami Yamazaki, Tokyo (JP)

(73) Assignee: Sumitomo Bakelite Company Limited, Tokyo (JP)

( * ) Notice: Subject to any disclaimer, the term of this patent is extended or adjusted under 35 U.S.C. 154(b) by 284 days.

(21) Appl. No.: 13/393,092

(22) PCT Filed: Jul. 9, 2010

(86) PCT No.: PCT/JP2010/061662
§ 371 (c)(1),
(2), (4) Date: Feb. 28, 2012

(87) PCT Pub. No.: WO2011/024567
PCT Pub. Date: Mar. 3, 2011

(65) Prior Publication Data
US 2012/0157573 A1 Jun. 21, 2012

(30) Foreign Application Priority Data
Aug. 31, 2009 (JP) ................................. 2009-200480

(51) Int. Cl.
*B29C 43/08* (2006.01)
*B29C 33/60* (2006.01)
*B29C 33/64* (2006.01)
*B29C 33/62* (2006.01)
*B29C 43/36* (2006.01)
*B29C 33/58* (2006.01)

(52) U.S. Cl.
CPC ................. *B29C 33/58* (2013.01); *B29C 33/64* (2013.01); *B29C 33/62* (2013.01); *B29C 43/36* (2013.01); *B29C 2043/3618* (2013.01)
USPC ............... 425/96; 425/99; 425/100; 425/107; 425/345

(58) Field of Classification Search
USPC .............. 425/96, 99, 100, 107, 215, 218, 345
See application file for complete search history.

(56) References Cited

U.S. PATENT DOCUMENTS 5,017,122 A * 5/1991 Staniforth ..................... 425/107
5,462,427 A * 10/1995 Kramer ......................... 425/345
(Continued)

FOREIGN PATENT DOCUMENTS

CN           1551820 A      12/2004
JP           1-266140 A     10/1989
(Continued)

OTHER PUBLICATIONS

Office Action issued Oct. 8, 2013, in Chinese Patent Application No. 201080038105.6.
(Continued)

*Primary Examiner* — Joseph S Del Sole
*Assistant Examiner* — Thukhanh Nguyen
(74) *Attorney, Agent, or Firm* — Birch, Stewart, Kolasch & Birch, LLP

(57) ABSTRACT

A molded product production device that includes a molding die having an inner circumferential surface defining a cavity with upper and lower openings, the cavity into which the molding material is to be filled, a lower punch provided so as to be inserted into the cavity from the lower opening thereof and vertically move, the lower punch having a lower punch surface and a lower punch release agent holding portion which is provided at a lower side of the lower punch surface and capable of holding a release agent, an upper punch provided so as to be inserted into the cavity from the upper opening thereof and vertically move, the upper punch having an upper punch surface, and a lower punch release agent supply means which supplies the release agent to the lower punch release agent holding portion when being exposed outside the cavity.

18 Claims, 8 Drawing Sheets

(56) References Cited

U.S. PATENT DOCUMENTS

| | | | |
|---|---|---|---|
| 6,830,442 B2 * | 12/2004 | Cecil | 425/107 |
| 6,884,054 B2 * | 4/2005 | Shimada | 425/107 |
| 2005/0040561 A1 | 2/2005 | Kubo et al. | |

FOREIGN PATENT DOCUMENTS

| | | |
|---|---|---|
| JP | 7-337046 A | 5/1995 |
| JP | 9-47900 A | 2/1997 |
| JP | 9-193149 A | 7/1997 |
| JP | 2007-258744 A | 10/2007 |
| WO | WO 03/037589 A1 | 5/2003 |

OTHER PUBLICATIONS

International Search Report, dated Aug. 24, 2010, issued in PCT/JP2010/061662.

* cited by examiner

MOLDED PRODUCT PRODUCTION DEVICE

TECHNICAL FIELD

The present invention relates to a molded product production device, a molded product production method (that is, a method of producing a molded product), and a molded product.

BACKGROUND ART

In general, a molded product production device, which produces a molded product (green compact) by compression molding a powdered molding material, includes a molding die defining therein a cylindrical cavity with upper and lower openings and having upper and lower end surfaces defining the upper and lower openings, respectively, a lower punch having a lower punch surface which is to be inserted into the cavity from the lower opening of the molding die, and an upper punch having an upper punch surface which is to be inserted into the cavity from the upper opening of the molding die (for example, Patent Document 1).

According to such a molded product production device, for example, in a state that the upper punch is located above the upper end surface of the molding die and the lower punch surface is located into the cavity and below the upper end surface of the molding die, the molding material is supplied onto the lower punch surface within the cavity, and then the upper punch surface is moved down so that the molding material is compression molded using the lower and upper punch surfaces.

Conventionally, in such a molded product production device, for the purpose of preventing adhesion or bonding of the molding material to the lower and upper punch surfaces and the like, a release agent is applied onto each of the lower and upper punch surfaces before the molding material is supplied into the cavity described above.

As described in the Patent Document 1, conventionally, in a state that the upper punch is located above the upper end surface of the molding die and the lower punch surface is aligned with (is flush with) the upper end surface of the molding die, a nozzle is put between the upper punch and the lower punch. Thereafter, the release agent is applied onto each of the lower and upper punch surfaces by spraying the release agent upward and downward from the nozzle.

However, in the molded product production device according to the Patent Document 1, the release agent is applied only onto the lower and upper punch surfaces. Therefore, it is impossible to prevent the molding material from adhering or bonding to an inner circumferential surface defining the cavity of the molding die. This causes quality defects of an obtained molded product, to thereby raise a problem in that productivity thereof is lowered. Such a problem becomes more remarkable if used is a molding material having a high adhesive property, a molding material having a high shrinkage ratio when being compression molded, or the like.

PRIOR ART DOCUMENT

Patent Document

Patent Document 1: WO 2003/037589

OUTLINE OF THE INVENTION

It is an object of the present invention to provide a molded product production method and a molded product production device by which a molded product having a high quality can be produced in excellent productivity, and a molded product having a high quality.

In order to achieve the object described above, the present invention includes the following features (1) to (18).

(1) A molded product production device adapted to be used for producing a molded body by compression molding a molding material, comprising:

a molding die having an inner circumferential surface defining a cavity with upper and lower openings, the cavity into which the molding material is to be filled;

a lower punch provided so as to be inserted into the cavity from the lower opening thereof and vertically move, the lower punch having a lower punch surface and a lower punch release agent holding which is portion provided at a lower side of the lower punch surface and capable of holding a release agent;

an upper punch provided so as to be inserted into the cavity from the upper opening thereof and vertically move, the upper punch having an upper punch surface; and a lower punch release agent supply means which supplies the release agent to the lower punch release agent holding portion when being exposed outside the cavity.

(2) The molded product production device according to the feature (1), wherein the lower punch release agent holding portion transfers the release agent held thereto to the inner circumferential surface defining the cavity as the lower punch moves inside the cavity.

(3) The molded product production device according to the feature (1) or (2), wherein the lower punch release agent supply means supplies the release agent to the lower punch release agent holding portion when being exposed outside the cavity from the lower opening thereof.

(4) The molded product production device according to any one of the features (1) to (3), wherein the lower punch release agent supply means supplies the release agent to the lower punch release agent holding portion when being exposed outside the cavity from the upper opening thereof.

(5) The molded product production device according to any one of the features (1) to (4), wherein the lower punch release agent supply means includes at least one nozzle which injects the release agent toward the lower punch release agent holding portion exposed outside the cavity.

(6) The molded product production device according to any one of the features (1) to (5), wherein before the molding material is filled into the cavity, the release agent is applied to the lower punch release agent holding portion, and then the lower punch is temporarily moved so that an upper end of a region of the lower punch release agent holding portion, to which the release agent has been applied, reaches in the vicinity of the upper opening of the cavity.

(7) The molded product production device according to any one of the features (1) to (6), wherein the lower punch release agent holding portion includes a plurality of concave portions and/or convex portions formed on an outer circumference of the lower punch.

(8) The molded product production device according to the feature (7), wherein each concave portion is a groove extending along the outer circumference of the lower punch in a horizontal direction.

(9) The molded product production device according to any one of the features (1) to (8) further comprising an upper punch release agent supply means having a function of applying a release agent to the upper punch.

(10) The molded product production device according to the feature (9), wherein the upper punch release agent supply means has a function of applying the release agent onto each of the upper and lower punch surfaces.

(11) The molded product production device according to the feature (9) or (10), wherein the upper punch release agent supply means also serves as the lower punch release agent supply means.

(12) The molded product production device according to any one of the features (9) to (11), wherein the upper punch further includes an upper punch release agent holding portion which is provided at an upper side of the upper punch surface and capable of holding the release agent, and wherein the upper punch release agent supply means has a function of supplying the release agent to the upper punch release agent holding portion.

(13) The molded product production device according to any one of the features (1) to (12), wherein an average thickness of the release agent applied on each of the upper punch surface, the lower punch surface and the inner circumferential surface defining the cavity is in the range of 0.001 to 50 μm.

(14) The molded product production device according to any one of the features (1) to (13), wherein the molding material is of a powdered state and contains a resin material.

(15) The molded product production device according to the feature (14), wherein the resin material comprises an epoxy-based resin material.

(16) The molded product production device according to the feature (14) or (15), wherein the release agent contains a silicone-based release agent.

(17) A method of producing a molded product using the molded product production device according to any one of the features (1) to (16), comprising:

a lower punch release agent supply step of supplying the release agent to the lower punch release agent holding portion in a state that the lower punch release agent holding portion is exposed outside the cavity;

a release agent transfer step of transferring the release agent held to the lower punch release agent holding portion to the inner circumferential surface defining the cavity as the lower punch moves inside the cavity;

a filling step of filling the molding material into the cavity; and a molding step of compression molding the molding material filled into the cavity using the upper and lower punches.

(18) A molded product produced using the molded product production device according to any one of the features (1) to (16).

BEST MODE FOR CARRYING OUT THE INVENTION

Hereinbelow, preferred embodiments of the present invention will be described based on the accompanying drawings.

<First Embodiment>

First, description will be made on a first embodiment of the present invention.

Figure 1:
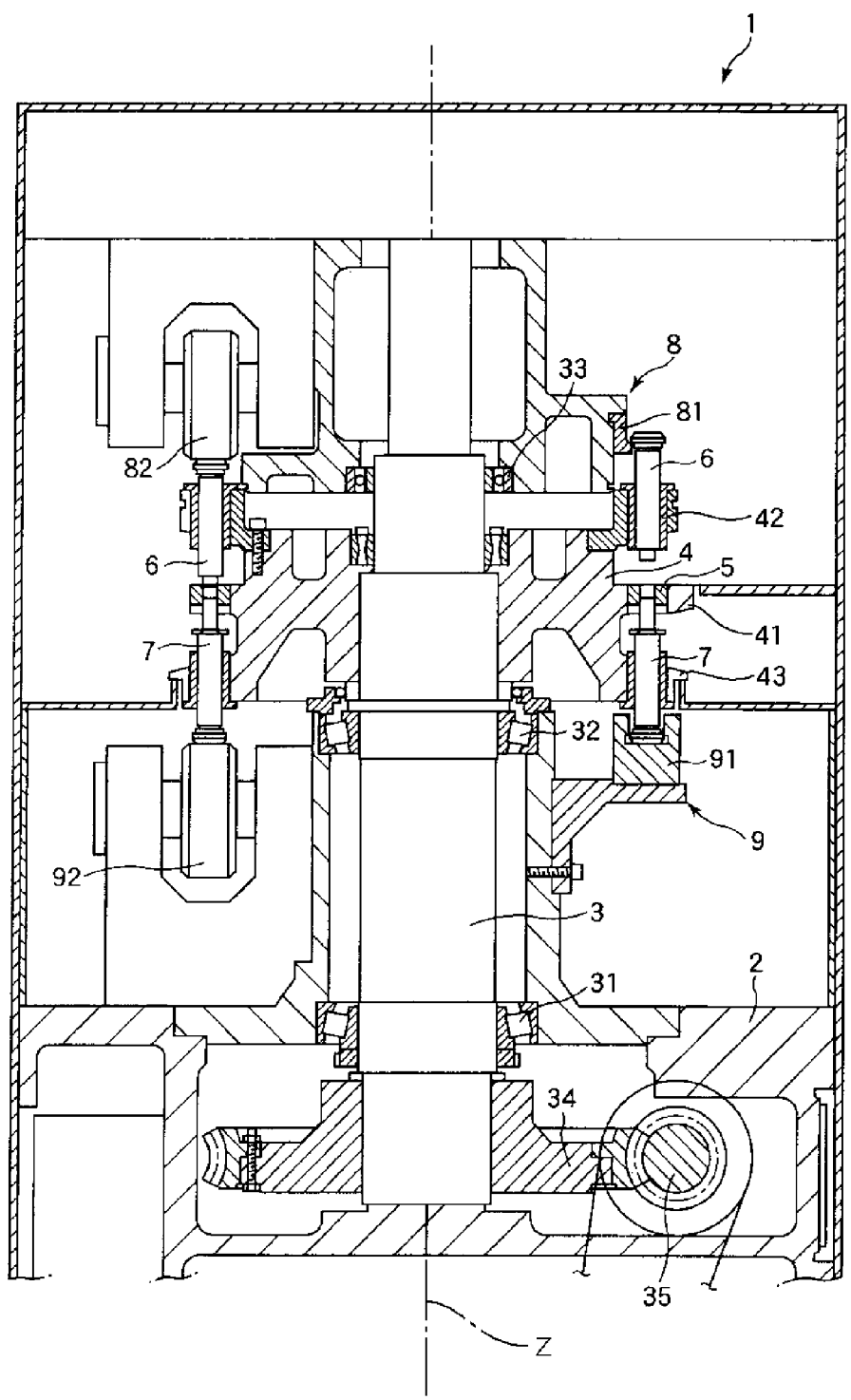
FIG. 1 is a sectional view showing the entire structure of a molded product production device according to a first embodiment of the present invention.
Figure 2:
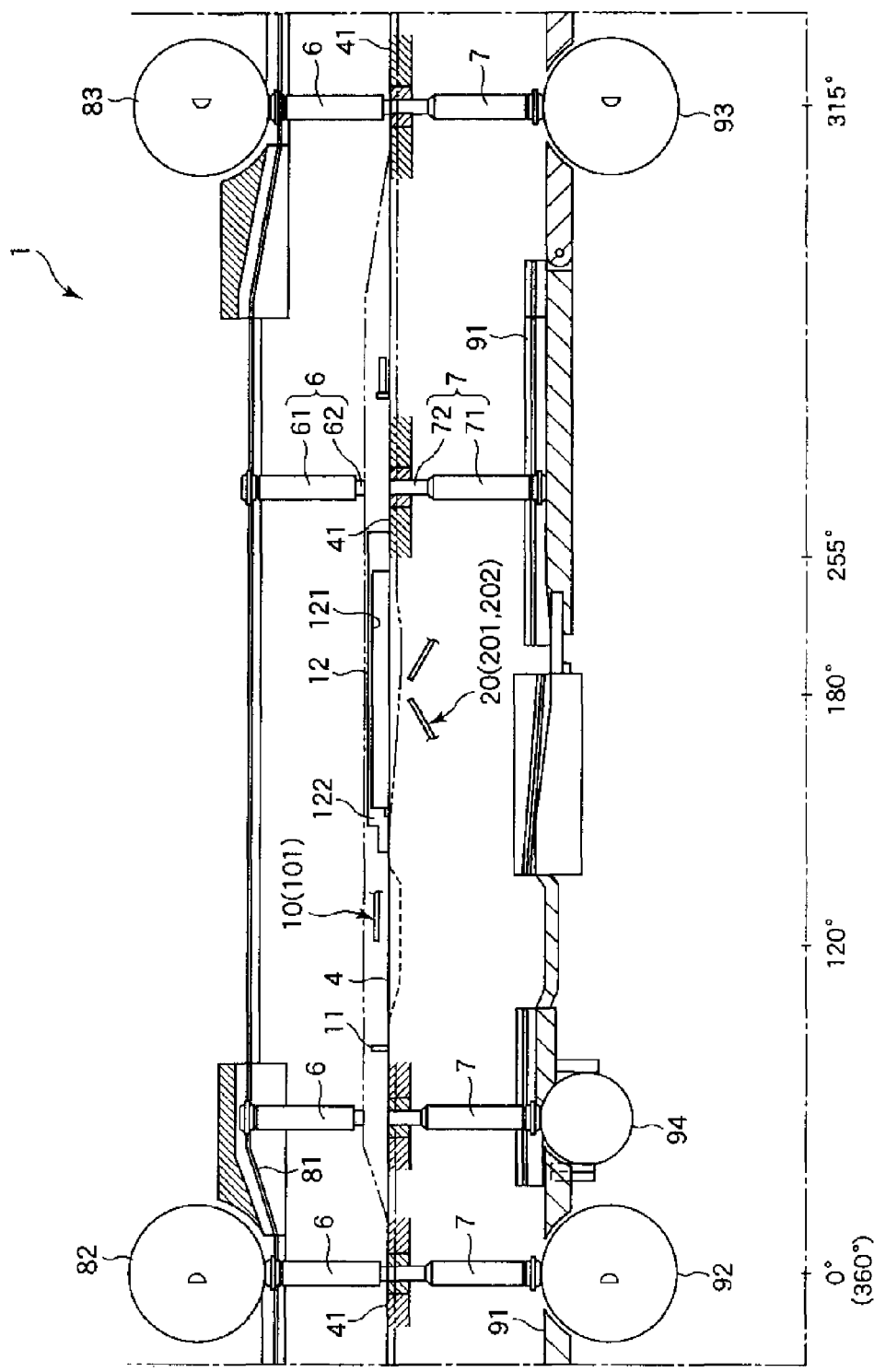
FIG. 2 is a development view (sectional view) of the molded product production device shown in FIG. 1 in a circumferential direction thereof.
Figure 3:
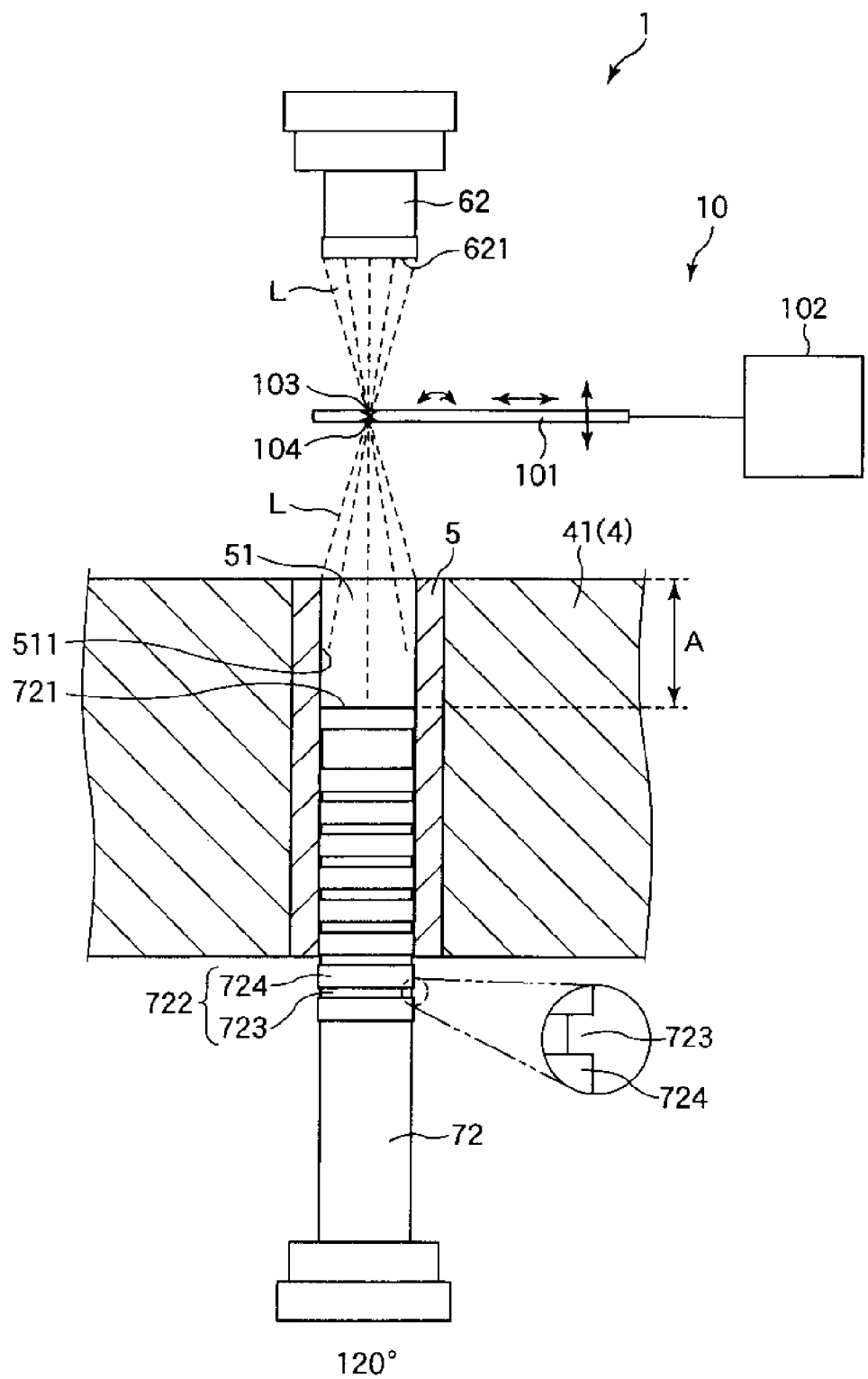
FIG. 3 is a partially enlarged sectional view showing the molded product production device shown in FIG. 1.
Figure 4:
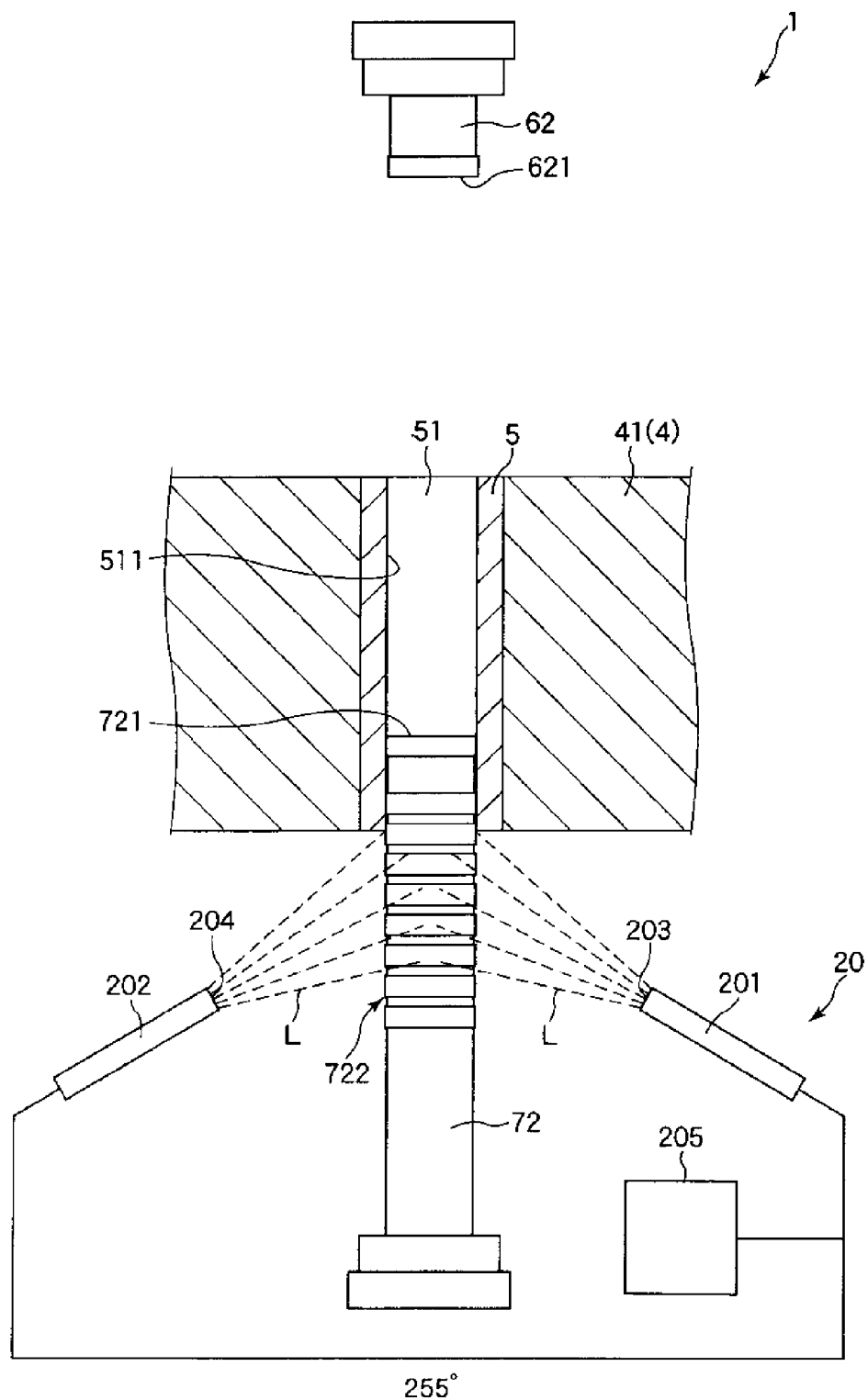
FIG. 4 is a partially enlarged sectional view showing the molded product production device shown in FIG. 1, which is continued from FIG. 3.
Figure 5:
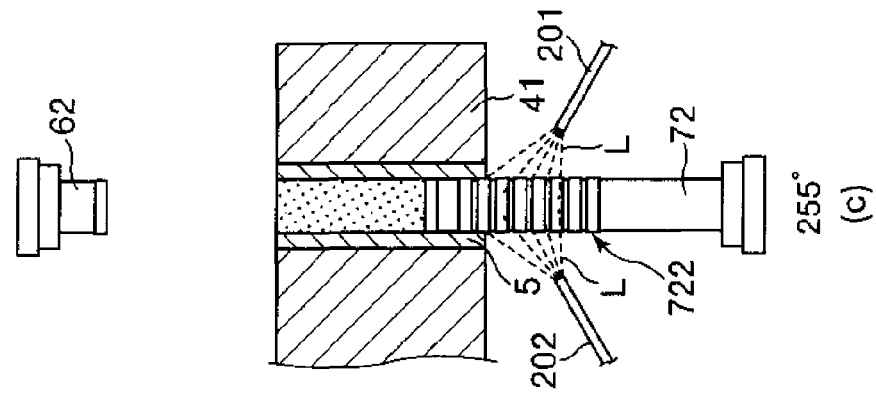
FIG. 5 is a view for explaining an operation of the molded product production device shown in FIG. 1.
Figure 5:
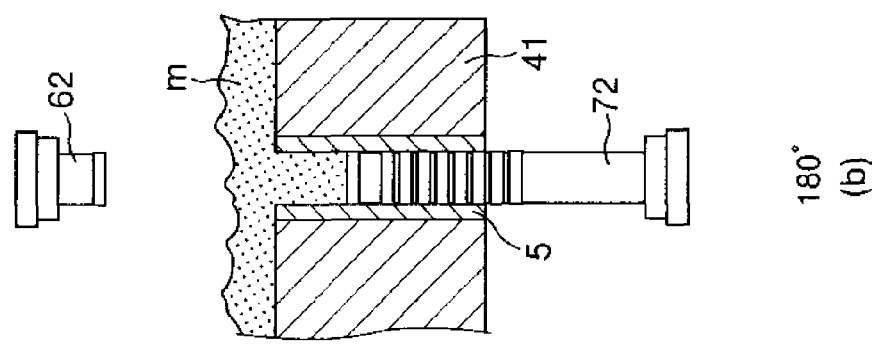
Figure 5:
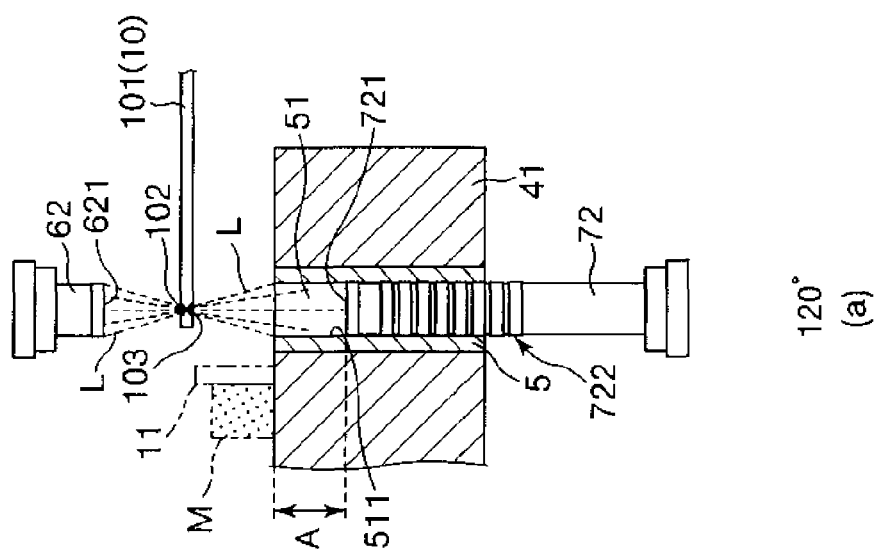
Figure 6:
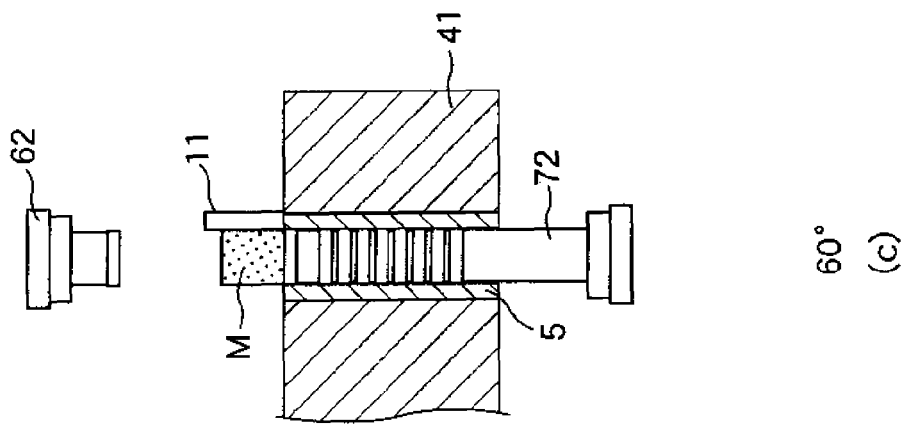
FIG. 6 is a view for explaining the operation of the molded product production device shown in FIG. 1, which is continued from FIG. 5.
Figure 6:
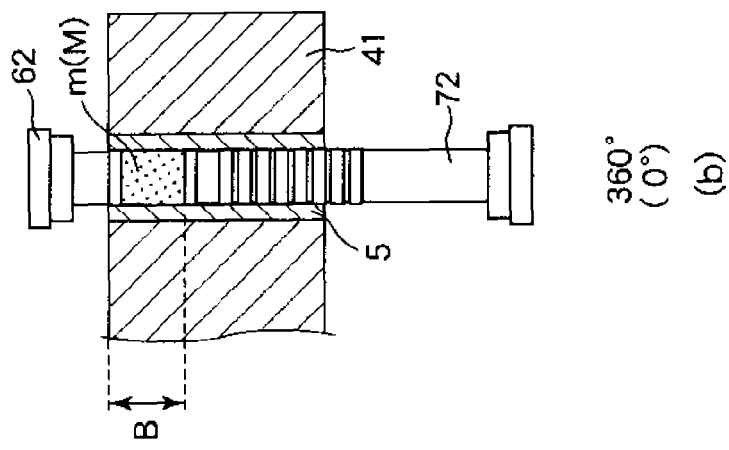
Figure 6:
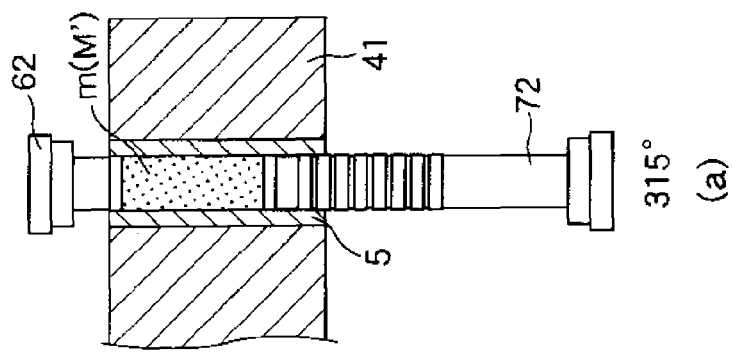

FIG. 1 is a sectional view showing the entire structure of a molded product production device according to the first embodiment of the present invention, FIG. 2 is a development view (sectional view) of the molded product production device shown in FIG. 1 in a circumferential direction thereof, FIG. 3 is a partially enlarged sectional view showing the molded product production device shown in FIG. 1 (in the vicinity of 120°), FIG. 4 is a partially enlarged sectional view showing the molded product production device shown in FIG. 1 (in the vicinity of 255°) and each of FIGS. 5 and 6 is a view for explaining an operation of the molded product production device shown in FIG. 1.

In this regard, although a material for sealing semiconductor (powdered resin material) is typically used as a molding material in this embodiment, the molding material is not limited thereto in the present invention. For example, a composition containing various kinds of inorganic materials or various kinds of organic materials can be used as the molding material, as long as it can be compression molded to produce a molded body (molded product).

A molded body production device (molded product production device) 1 according to this embodiment shown in FIG. 1 is a so-called rotary type molded body production device (tablet machine).

As shown in FIG. 1, such a molded body production device 1 includes a frame 2, a shaft 3 supported by the frame 2 so as to be capable of rotating about a Z axis, and a rotary table 4 attached to the shaft 3.

To the rotary table 4, a plurality of molding dies 5, a plurality of upper dies 6 and a plurality of lower dies 7 are attached.

Further, as shown in FIG. 2, an upper die elevating mechanism 8, a lower die elevating mechanism 9, an upper die release agent application mechanism 10, an ejection guide 11, a molding material supply mechanism 12 and a lower die release agent application mechanism 20 are fixedly (unrotatably) provided on the frame 2 around the shaft 3, respectively. In FIG. 2, a position at which cams 82, 92 described below are provided (that is, a position where final compression described below is carried out) is defined as a reference position (0°), and an angle about an axis line Z is shown.

In such a molded body production device 1, the plurality of molding dies 5, the plurality of upper dies 6 and the plurality of lower dies 7 rotate about the Z axis together with the rotary table 4. With the rotation of the rotary table 4, the upper die elevating mechanism 8 moves vertically each upper die 6, and the lower die elevating mechanism 9 moves vertically each lower die 7.

On the other hand, each molding die 5 is selectively subjected to application of the release agent by the upper die release agent application mechanism 10, application of the release agent by the lower die release agent application mechanism 20 and filling of the molding material by the molding material supply mechanism 12, depending on a rotation angle thereof.

At this time, each molding die 5 is selectively and sequentially subjected to the application of the release agent by the upper die release agent application mechanism 10 (that is, this step is a release agent application step), the application of the release agent by the lower die release agent application mechanism 20 (that is, this step is a release agent application step), the filling of the molding material by the molding material supply mechanism 12 (that is, this step is a molding material filling step), compression molding of the molding material filled into the molding die 5 using the upper die 6 and the lower die 7 (that is, this step is a compression molding step), upward extrusion of a molded body obtained by the compression molding from the molding die 5 due to moving up of the lower die 7, and ejection of the extruded molded body by the ejection guide 11 (that is, this step is a molded body ejection step).

Hereinbelow, description will be made on each of the components constituting such a molded body production device 1 in detail one after another.

The shaft 3 is supported by the frame 2 through bearings 31, 32, 33 so that it can rotate about the vertical axis line Z.

To a lower end portion of such a shaft 3, a worm wheel 34 is provided (secured). This worm wheel 34 is engaged to a worm 35 which is rotatably driven by a driving mechanism not shown in the drawings.

Further, to the shaft 3, the rotary table 4 is provided (secured).

The rotary table 4 includes a stage 41 to which the plurality of molding dies 5 are fixed, an upper die hold portion 42 holding the plurality of upper dies 6 so as to vertically move and a lower die hold portion 43 holding the plurality of lower dies 7 so as to vertically move.

The plurality of molding dies 5 are provided to the stage 41 so as to pass through the stage 41 in a vertical direction thereof.

The plurality of molding dies 5 are also provided so that distances therefrom to the axis line Z are equal to each other (that is, the molding dies 5 are provided at positions each having the same semidiameter from the axis line Z), and are provided in regular intervals along a circumferential direction about the axis line Z.

Each molding die 5 has a cavity 51 with upper and lower openings therein.

In this embodiment, the cavity 51 is of a cylindrical shape extending along a vertical direction. Namely, a horizontal section of the cavity 51 is of a circular shape, and a horizontal section area of the cavity 51 is constant in almost all regions of the vertical direction. In this regard, since a horizontal section shape of the cavity 51 is set based on a shape of a desired molded body or the like, it is not limited to the circular shape, but may be an elliptical shape, a polygonal shape and the like. Further, the horizontal section area of the cavity 51 may have a local portion which is expanded or condensed.

Into such a cavity 51, the molding material is supplied (filled) by the molding material supply mechanism 12.

The molding material supply mechanism 12 includes a supply unit 122 having a concave portion 121 to which the molding material is supplied from a hopper not shown in the drawings.

This supply unit 122 is provided at a position having the same semidiameter from the axis line Z as that of the molding dies 5 and at a predetermined position along the circumferential direction about the axis line Z. Further, the supply unit 122 is capable of sliding with respect to an upper surface of the stage 41 of the rotary table 4.

The concave portion 121 opens downward.

In such a molding material supply mechanism 12, when the cavity 51 moves below the concave portion 121, the molding material supplied in the concave portion 121 drops toward the cavity 51 to be filled thereinto.

The molding material is not limited to a specific kind as long as it can be compression molded to thereby obtain a molded body. In the case where, for example, a tablet to be used for sealing semiconductor is produced, a molding material (resin composition) containing a curable resin and a curing agent is used.

Examples of the curable resin include: a novolac-type phenol resin such as phenol novolac resin, cresol novolac resin or bisphenol A novolac resin; a phenol resin such as resol-type phenol resin; an epoxy resin such as a novolac-type epoxy resin (e.g., phenol novolac-type epoxy resin, cresol novolac-type epoxy resin), a bisphenol-type epoxy resin (e.g., bisphenol A-type epoxy resin, bisphenol F-type epoxy resin), a hydroquinone-type epoxy resin, a biphenyl-type epoxy resin, a stilbene-type epoxy resin, a triphenol methane-type epoxy resin, an alkyl-modified triphenol methane-type epoxy resin, a triazine ring-containing epoxy resin, a dicyclopentadiene-modified phenol-type epoxy resin, a naphthol-type epoxy resin, a naphthalene-type epoxy resin or an aralkyl-type epoxy resin (e.g., phenylene chemical structure and/or biphenylene chemical structure-containing phenol aralkyl-type epoxy resin, phenylene chemical structure and/or biphenylene chemical structure-containing naphthol aralkyl-type epoxy resin); a triazine ring-containing resin such as urea resin or a melamine resin; an unsaturated-polyester resin; a bismaleimide resin; a polyurethane resin; a diallyl phthalate resin; a silicone resin; a benzoxazine ring-containing resin; a cyanate ester resin; and the like.

One of them can be used alone or two or more of them can be used in combination. Among them, it is preferable to use the epoxy resin.

Further, in the case where the molding material is of a powdered state, a green compact can be obtained using the molded body production device 1 as the molded body. Furthermore, in the case where the molding material is of the powdered state, the powder to be molded has a low softening temperature or the molding material contains an epoxy-based resin material, the molding material is easy to bond to an upper punch surface 621, a lower punch surface 721 and an inner circumferential surface defining the cavity 51 each described below. Therefore, by using the present invention in such a case, the effects thereof can be remarkably exhibited.

On the other hand, examples of the curing agent include an amine-type curing agent such as an aliphatic polyamine (e.g., diethylene triamine (DETA), triethylene tetramine (TETA), metaxylylene diamine (MXDA)), an aromatic polyamine (e.g., diamino diphenyl methane (DDM), m-phenylene diamine (MPDA), diamino diphenyl sulfone (DDS)), dicyandiamide (DICY) or a polyamine compound containing organic acid dihydrazide; a phenol-type curing agent (curing agent having phenolic hydroxyl group) such as a novolac-type phenol resin or a phenol polymer; an acid anhydride-type curing agent such as an aliphatic acid anhydride (liquid acid anhydride) (e.g., hexahydro phthalic anhydride (HHPA), methyl tetrahydro phthalic acid anhydride (MTHPA)) or an aromatic acid anhydride (e.g., trimellitic acid anhydride (TMA), pyromellitic acid dianhydride (PMDA), benzophenone tetracarboxylic acid dianhydride (BTDA)); a polyamide resin and a polysulfide resin.

One of them can be used alone or two or more of them can be used in combination. Especially, in the case where the epoxy resin is used as the curable resin, it is preferable to use the phenol-type curing agent (curing agent having phenolic hydroxyl group).

In this regard, it is to be noted that the molding material of the tablet to be used for sealing semiconductor may contain a resin other than the above curable resin and/or an inorganic filler, or may contain various kinds of additive agents such as an accelerator, a coupling agent, a coloring agent, a flame retardant, a low stress agent and an antioxidant.

Above such a stage 41 to which the plurality of molding dies 5 are secured, the upper die hold portion 42 is provided.

To the upper die hold portion 42, the plurality of upper dies 6 are provided so as to be capable of vertically moving.

The plurality of upper dies 6 are provided so as to correspond to the plurality of molding dies 5 described above. Each upper die 6 is inserted into the cavity 51 of the corresponding molding die 5 from the upper opening thereof.

Namely, the plurality of upper dies 6 are provided at the same distances as the distances from the above mentioned molding dies 5 to the axis line Z so that the distances thereof are equal to each other (that is, the upper dies 6 are provided at positions each having the same semidiameter from the axis line Z), and are provided at positions having the same pitches as the above mentioned pitches of the plurality of molding dies 5 in regular intervals along the circumferential direction about the axis line Z.

As shown in FIG. 2, each upper die 6 includes an upper die main body 61 and an upper punch 62 fitted to the upper die main body 61.

The upper die main body 61 is provided so as to be capable of vertically sliding with respect to the upper die hold portion 42.

To a lower portion of the upper die main body 61, the upper punch 62 is fitted.

The upper punch 62 has an upper punch surface 621 at a lower end thereof (see FIG. 3). This upper punch surface 621 can vertically move and is inserted into the corresponding cavity 51 from the upper opening thereof.

The lower die hold portion 43 is provided so as to face the upper die hold portion 42, by which the plurality of upper dies 6 are held, through the stage 41. Namely, below the stage 41, the lower die hold portion 43 is provided.

To the lower die hold portion 43, the plurality of lower dies 7 are provided so as to be capable of vertically moving.

The plurality of lower dies 7 are provided so as to correspond to the plurality of molding dies 5 described above. Each lower die 7 is inserted into the cavity 51 of the corresponding molding die 5 from the lower opening thereof.

Namely, the plurality of lower dies 7 are provided at the same distances as the distances from the above mentioned molding dies 5 to the axis line Z so that the distances thereof are equal to each other (that is, the lower dies 7 are provided at positions each having the same semidiameter from the axis line Z), and are provided at positions having the same pitches as the above mentioned pitches of the plurality of molding dies 5 in regular intervals along the circumferential direction about the axis line Z.

As shown in FIG. 2, each lower die 7 includes a lower die main body 71 and a lower punch 72 fitted to the lower die main body 71.

The lower die main body 71 is of a cylindrical shape and is provided so as to be capable of vertically sliding with respect to the lower die hold portion 43.

To an upper portion of the lower die main body 71, the lower punch 72 is fitted.

The lower punch 72 has a lower punch surface 721 at an upper end thereof and a lower punch release agent holding portion 722 formed on a side surface of the lower die main body 71 (see FIG. 3).

This lower punch surface 721 can vertically move and is inserted into the corresponding cavity 51 from the lower opening thereof.

The lower punch release agent holding portion 722 is provided at a lower side of the lower punch surface 721 (that is, an upper side portion of the lower die main body 71) and capable of holding the release agent L.

Such a lower punch release agent holding portion 722 is constructed from a plurality of concave portions 723 and a plurality of convex portions 724. This lower punch release agent holding portion 722 transfers the release agent L held thereto to the inner circumferential surface defining the cavity 51 as the lower punch 72 moves inside the cavity 51 (in this embodiment, upward).

This makes it possible to apply the release agent L to the inner circumferential surface defining the cavity 51. Therefore, it is possible to prevent the molding material from adhering or bonding to the inner circumferential surface defining the cavity 51. As a result, the obtained molded body M can have a high quality.

In this embodiment, each concave portion 723 is a groove extending along an outer circumference of the lower punch 72 in a horizontal direction. On the other hand, each convex portion 724 is a rib provided between the concave portions 723 and extending along the outer circumference of the lower punch 72 in the horizontal direction.

Further, a cross section shape of each concave portion 723 (groove) is of a rectangle shape. In this regard, it is to be noted that the cross section shape of each concave portion 723 is not limited thereto, but may be of a triangular or semicircle shape whose width narrows from an opening side to a bottom side or the like.

Such a lower punch release agent holding portion 722 including the plurality of concave portions 723 and the plurality of convex portions 724 formed on the lower punch 72 can hold the release agent L regardless of being a relatively simple structure. Further, such a lower punch release agent holding portion 722 can efficiently transfers the release agent L held thereto to the inner circumferential surface defining the cavity 51 at the time of need (specifically, when it is inserted into the cavity 51).

Each upper die 6 can be vertically moved by the upper die elevating mechanism 8. Further, each lower die 7 can be vertically moved by the lower die elevating mechanism 9.

The upper die elevating mechanism 8 includes a guide rail 81 and cams 82, 83.

The guide rail 81 is provided around the shaft 3 along the circumferential direction.

This guide rail 81 is configured so as to be engaged to an upper end portion of each upper die 6 described above and change a vertical position of this engagement portion thereof along the circumferential direction. Therefore, with the rotation of the rotary table 4, the guide rail 81 moves vertically each upper die 6.

Each of the cams 82, 83 is provided at an end portion or a predetermined halfway portion of the guide rail 81.

Each of these cams 82, 83 has a function of pushing the upper die 6 downward.

The lower die elevating mechanism 9 includes a guide rail 91 and cams 92, 93, 94.

The guide rail 91 is provided around the shaft 3 along the circumferential direction.

This guide rail 91 is configured so as to be engaged to a lower end portion of each lower die 7 described above and change a vertical position of this engagement portion thereof along the circumferential direction. Therefore, with the rotation of the rotary table 4, the guide rail 91 moves vertically each lower die 7.

Each of the cams 92, 93, 94 is provided at an end portion or a predetermined halfway portion of the guide rail 91.

Each of these cams 92, 93, 94 has a function of pushing the lower die 7 upward. Especially, the cam 92 is provided so as to correspond to (face) the above mentioned cam 82 (through the rotary table 4). Further, the cam 93 is provided so as to correspond to (face) the above mentioned cam 83 (through the rotary table 4).

In this way, the cam 82 and the cam 92 are paired. Further, the cam 83 and the cam 93 are paired.

As described below, the cams 83, 93 apply pressure for preliminarily compression molding (preliminarily compressing) the molding material filled into the cavity 51 of the molding die 5 to the upper die 6 (upper punch 62) and the lower die 7 (lower punch 72). Further, the cams 82, 92 apply pressure for finally compression molding (finally compressing) the molding material filled into the cavity 51 of the molding die 5 to the upper die 6 (upper punch 62) and the lower die 7 (lower punch 72) after the above preliminary compression.

Further, the cam 94 applies pressure for extruding the molded body obtained by compression molding outside the cavity 51 to the lower die 7 (lower punch 72).

The ejection guide 11 is provided on the stage 41 of the rotary table 4 at a latter region with respect to the cam 94 (that is, the right side in FIG. 2).

This ejection guide 11 is fixedly provided with respect to the frame 2 so that it shoves the molded body M extruded from the molding die 5 due to the pressure of the cam 94 toward a predetermined area outside the rotary table 4.

A nozzle 101 of the upper die release agent application mechanism 10 is provided at a latter region with respect to the ejection guide 11 (that is, the right side in FIG. 2).

Here, description will be made on the upper die release agent application mechanism 10 in detail based on FIG. 3.

This upper die release agent application mechanism 10 can inject the release agent L toward the above mentioned upper punch surface 621 and inject the release agent L toward the lower punch surface 721.

Especially, this upper die release agent application mechanism (upper punch release agent supply means) 10 applies the release agent L to each of the upper punch surface 621, the lower punch surface 721 and the inner circumferential surface defining the cavity 51 before the molding material is filled into the cavity 51 as described below.

Specifically, the upper die release agent application mechanism 10 is configured so as to apply the release agent L onto the upper punch surface 621 by injecting the release agent L toward the upper punch surface 621 in a state that the upper punch 62 is located above an upper end surface of the molding die 5 defining the upper opening of the cavity 51, and apply the release agent L onto each of the lower punch surface 721 and the inner circumferential surface exposing above the lower punch surface 721 by injecting the release agent L toward the lower punch surface 721 in a state that the lower punch surface 721 is located into the cavity 51 and below the upper end surface of the molding die 5.

In this embodiment, the injection of the release agent L toward the upper punch surface 621 and the injection of the release agent L toward the lower punch surface 721 are carried out at the same time.

This makes it possible to apply the release agent L to each of the upper punch surface 621, the lower punch surface 721 and the inner circumferential surface defining the cavity 51 before the molding material is compression molded. Therefore, it is possible to prevent the molding material from adhering or bonding to each of the upper punch surface 621, the lower punch surface 721 and the inner circumferential surface defining the cavity 51. As a result, occurrence of cord, crack or the like can be prevented in the obtained molded body.

Such an upper die release agent application mechanism (upper die release agent injection means) 10 includes, as shown in FIG. 3, a nozzle 101 and a release agent supply device 102.

The nozzle 101 is of a long shape. A distal end portion of the nozzle 101 is provided at the same distance as the distances from the molding dies 5 to the axis line Z, and is provided at a predetermined position along the circumferential direction about the axis line Z so as to be located between the stage 41 and the upper die hold portion 42.

At a distal end portion of the nozzle 101, a nozzle hole (upper nozzle hole) 103 opening upward and a nozzle hole (lower nozzle hole) 104 opening downward are formed.

The nozzle hole 103 injects (sprays) the release agent upward, and the nozzle hole 104 is provided so as to be separated from the nozzle hole 103 and injects (sprays) the release agent.

Further, a flow path is formed inside the nozzle 101 along a longitudinal direction thereof so as to communicate each of the nozzle holes 103, 104. The flow path is connected to the release agent supply device 102 so that the release agent passes therethrough.

In this embodiment, the nozzle 101 is supported by the frame 2 through an adjustment mechanism not shown in the drawings. In this way, the nozzle 101 can move vertically and change an orientation thereof.

Namely, the upper die release agent application mechanism 10 is configured so that the nozzle holes 103, 104 can move vertically and change orientations thereof.

By vertically moving the nozzle holes 103, 104, it is possible to apply the release agent L to each of the upper punch surface 621, the lower punch surface 721 and the inner circumferential surface defining the cavity 51, with optimizing each of a distance between the nozzle hole 103 and the upper punch surface 621 and a distance between the nozzle hole 104 and the lower punch surface 721.

Further, by changing the orientations of the nozzle holes 103, 104, even in the case where molding conditions are changed, it is possible to uniformly and reliably apply the release agent L to each of the upper punch surface 621, the lower punch surface 721 and the inner circumferential surface defining the cavity 51.

The release agent supply device 102 supplies the release agent (release agent solution) to the nozzle 101. This release agent supply device 102 is not limited to a specific type as long as it can inject the release agent from each of the nozzle holes 103, 104. For example, the release agent supply device 102 may include a tank in which the release agent is stored, a pump which supplies the release agent stored in the tank to the nozzle 101 by being pressed, and an adjustment mechanism such as a valve which adjusts the pressure of the pump.

The release agent is selected based on the molding material to be used. Therefore, the release agent is not limited to a specific kind as long as it can exhibit a releasing property with respect to the molding material. Examples of the release agent include a silicone-based release agent such as organopolysiloxane, a fluorine-based release agent such as polytetrafluorethylene, an alcohol-based release agent such as polyvinyl alcohol, waxes such as paraffin, higher fatty acid, higher fatty acid metal salt, an ester-based wax, a polylefine-based wax, polyethylene and oxidation polyethylene, and the like. One of them may be used alone or two or more of them may be used in combination.

Among them, it is preferable to use the silicone-based release agent, and more preferable to use carboxyl-modified dimethyl polysiloxane as the release agent. Such a release agent has an excellent releasing property with respect to the molding material. Therefore, it is possible to more reliably prevent the molding material from adhering or bonding to each of the upper punch surface 621, the lower punch surface 721 and the inner circumferential surface defining the cavity 51. Further, there is a merit in that the release agent hardly has an effect on the obtained molded body.

A character of such a release agent is not limited to a specific type. The release agent can be used as a low viscosity liquid, a high viscosity liquid or a powdered solid. Further, the liquid release agent can be directly used, or the liquid or solid release agent can be used by being diluted or dissolved into a solvent.

Such a solvent is not limited to a specific kind as long as it can dissolve the release agent thereinto. As the solvent, a general solvent such as hexane, pentane, hydrofluoro ether or decafluoro pentane can be used. Among them, it is preferable to use the pentane (more specifically, n-pentane) as the solvent. The pentane has excellent compatibility with the silicone-based release agent.

Therefore, in the case where a release agent (release agent solution) prepared by dissolving the silicone-based release agent into the pentane is used, the release agent can be uniformly diluted and sprayed. Further, since the pentane has too high volatility, the solvent contained in the release agent solution can be rapidly vaporized after the release agent is sprayed, to thereby prevent the solvent from being contaminated into a product (molded body).

In the case where the release agent is a high viscosity liquid having a kinetic viscosity at 25° C. measured using an Ubbelohde viscometer being $3\times10^{-3}$ m$^2$/s or more or a powdered solid, it is preferred that such a release agent is used in a state that it is dissolved into the solvent (that is, it is prepared as the release agent solution). In this case, an usage ratio of the release agent to the solvent is not limited to a specific value as long as the release agent has been dissolved into the solvent.

The usage ratio of the release agent to the solvent is preferably in the range of 0.01 to 10 wt %, more preferably in the range of 0.05 to 5 wt %, and even more preferably in the range of 0.1 to 3 wt %. This makes it possible to easily spray the release agent solution using a sprayer or the like, and to apply the release agent thinly and uniformly.

Further, in the case where the release agent is a low viscosity liquid having a kinetic viscosity at 25° C. measured using the Ubbelohde viscometer being less than $3\times10^{-3}$ m$^2$/s, such a release agent can be used directly, but also may be used in a state that it is dissolved into the solvent (that is, it is prepared as the release agent solution), if needed. In this case, the usage ratio of the release agent to the solvent is not limited to a specific value as long as the release agent has been dissolved into the solvent.

The usage ratio of the release agent to the solvent is preferably in the range of 0.1 to 50 wt %, and more preferably in the range of 1 to 20 wt %. This makes it possible to apply the release agent thinly and uniformly and to constrict the usage of the solvent.

At a latter region with respect to the nozzle 101 of such an upper die release agent application mechanism 10 (that is, the right side in FIG. 2), nozzles 201, 202 of the lower die release agent application mechanism 20 is provided.

Here, description will be made on the lower die release agent application mechanism 20 in detail based on FIG. 4.

This lower die release agent application mechanism 20 supplies the release agent L to the above mentioned lower punch release agent holding portion 722 when the lower punch release agent holding portion 722 is exposed outside the cavity.

Such a lower die release agent application mechanism (lower die release agent supply means) 20 includes, as shown in FIG. 4, the nozzles 201, 202 and a release agent supply device 205.

The nozzles 201, 202 are provided so as to be opposite to each other through the lower punch 72 rotated at a predetermined rotation angle (in this embodiment, 255°)

At a distal end portion (distal end surface) of the nozzle 201, a nozzle hole 203 is formed. Further, at a distal end portion (distal end surface) of the nozzle 202, a nozzle hole 204 is formed.

The nozzle holes 203, 203 inject (spray) the release agent, respectively.

A flow path is formed inside the nozzle 201 along a longitudinal direction thereof so as to communicate the nozzle hole 203. Further, a flow path is formed inside the nozzle 202 along a longitudinal direction thereof so as to communicate the nozzle hole 204. These flow paths are connected to the release agent supply device 205 so that the release agent passes therethrough.

In this regard, it is to be noted that the nozzles 201, 202 may move vertically and change orientations thereof, respectively, like the above mentioned nozzles 101, 102.

The release agent supply device 205 can have the same structure as the above mentioned release agent supply device 102. Further, the above mentioned release agent supply device 102 may double as the release agent supply device 205.

Further, as the release agent of the lower die release agent application mechanism 20, the same kind as the release agent used in the upper die release agent application mechanism 10 may be used.

Such a lower die release agent application mechanism 20 supplies the release agent L to the lower punch release agent holding portion 722 when the lower punch release agent holding portion 722 is exposed outside the cavity 51 from the lower end surface of the molding die 5 defining the lower opening of the cavity 51, as shown in FIG. 4. This lower die release agent application mechanism 20 can supply the release agent L to the inner circumferential surface defining the cavity 51, while simplifying and downsizing the structure thereof.

The lower punch in which the release agent L is applied to the lower punch release agent holding portion 722 is temporarily moved so that an upper end of the lower punch release agent holding portion 722 reaches in the vicinity of the upper opening of the cavity 51 before the molding material is filled into the cavity 51.

This makes it possible to apply the release agent L to the inner circumferential surface defining the cavity 51 before the molding material is filled into the cavity 51. Therefore, it is possible to prevent the molding material from adhering or bonding to the inner circumferential surface defining the cavity 51. As a result, the obtained molded body can have a high quality.

Next, description will be made on a molded body production method (molded product production method) of the present invention as one example in which a molded body is produced using the molded body production device 1 constituted as described above.

In the molded body production device 1, each molding die 5 is rotated together with the corresponding upper punch 62 and lower punch 72 with the rotation of the rotary table 4 about the Z axis. According to the rotation angle of the molding die 5, the release agent application step, the molding material filling step, the compression molding step and the molded body ejection step are sequentially carried out.

Namely, the molded body production method using the molded body production device 1 includes [1] the release agent application step (upper punch release agent supply step), [2] the molding material filling step, [3] the compression molding step and [4] the molded body ejection step.

In this embodiment, the release agent is supplied to the above mentioned lower punch release agent holding portion 722 during the step [2] (that is, this step is a lower punch release agent supply step), and the release agent held to the lower punch release agent holding portion 722 is transferred to the inner circumferential surface defining the cavity during the step [4] (that is, this step is a transfer step). The above steps [1] to [4] are repeatedly carried out in this order.

Namely, in repeating the above steps [1] to [4], the molded body production method using the molded body production device 1 includes [A] a lower punch release agent application step (that is, the step [2] in or before the previous time), [B] a release agent transfer step (that is, the step [4] in or before the previous), [C] the molding material filling step (that is, this step is the step [2]) and [D] the compression molding step (that is, this step is the step [3]).

Hereinbelow, each of the steps will be described in detail one after another.

[1] Release Agent Application Step (Upper Punch Release Agent Application Step)

First, as shown in FIG. 5(a), the release agent L is applied onto each of the upper punch surface 621, the lower punch surface 721 and the inner circumferential surface defining the cavity 51.

At this time, a rotation angle about the axis line Z of the molding die 5, the upper punch 62 and the lower punch 72 is 120°.

Further, the upper punch surface 621 of the upper punch 62 is located above the upper end surface of the molding die 5 due to the action of the guide rail 81 of the upper die elevating mechanism 8 (that is, the upper punch surface 621 is away from the upper end surface of the molding die 5). On the other hand, the lower punch surface 721 of the lower punch 72 is located inside the molding die 5 and below the upper end surface thereof due to the action of the guide rail 91 of the lower die elevating mechanism 9.

Furthermore, the distal end portion of the nozzle 101 is placed between the upper punch surface 621 and the lower punch surface 721.

Given such an alignment of the molding die 5, the upper punch 62, the lower punch 72 and the nozzle 101, the release agent is injected upward (toward the upper punch surface 621) from the nozzle hole 103 of the nozzle 101 and injected downward (toward the lower punch surface 721) from the nozzle hole 104 of the nozzle 101.

In this way, the release agent injected from the nozzle hole 103 of the nozzle 101 is applied on the upper punch surface 621. Further, since as described above, the lower punch surface 721 of the lower punch 72 is located inside the molding die 5 and below the upper end surface thereof, the release agent injected from the nozzle hole 104 is applied on not only the lower punch surface 721 but also a region where the inner circumferential surface 511 defining the cavity 51 of the molding die 5 is exposed above the lower punch surface 721.

In this step, a distance between the lower punch surface 721 and the upper end surface of the molding die 5 when the release agent L is injected by the upper die release agent application mechanism 10 is defined as "A" and a distance between the lower punch surface 721 and the upper end surface of the molding die 5 when the molding material m filled into the cavity 51 is compression molded using the upper and lower punch surfaces 621, 721 (that is, during the final compression in the step [3] described below) is defined as "B", A/B is preferably in the range of 0.5 to 1.5, and more preferably in the range of 0.7 to 1.2. This makes it possible to more reliably prevent the molding material m from adhering or bonding to the inner circumferential surface defining the cavity 51 after the step [3] described below.

Further, a distance between the lower punch surface 721 and the upper end surface of the molding die 5 when the molding material m is filled into the cavity 51 (that is, during the quantity adjustment in the step [2] described below) is defined as "C", A/C is preferably in the range of 0.4 to 1.2, and more preferably in the range of 0.5 to 1.0. This makes it possible to apply the release agent L on a region of the inner circumferential surface defining the cavity 51 with which the molding material makes contact.

Further, a thickness (average thickness) of the release agent L applied on each of the upper punch surface 621, the lower punch surface 721 and the inner circumferential surface 511 defining the cavity 51 is not limited to a specific value, but is preferably in the range of 0.001 to 50 µm, more preferably in the range of 0.01 to 50 µm, and even more preferably in the range of 0.05 to 10 µm. This makes it possible to prevent the molding material m from adhering or bonding to each of the upper punch surface 621, the lower punch surface 721 and the inner circumferential surface 511 defining the cavity 51, while preventing a molded body finally obtained from being adversely affected by the release agent L.

In this regard, the thickness of the release agent L (that is, a layer formed from the release agent L) may be measured using various kinds of thickness measurement devices, or may be calculated based on a surface area of each of the upper punch surface 621, the lower punch surface 721 and the inner circumferential surface 511 defining the cavity 51, a dilution ratio of the release agent L by the solvent and an application amount of the release agent L.

[2] Molding Material Filling Step ([C] Molding Material Filling Step)

Next, the molding material m is filled into the cavity 51.

More sufficiently, first, as shown in FIG. 5(b), the filling of the molding material m into the cavity 51 is started.

At this time, the rotation angle about the axis line Z of the molding die 5, the upper punch 62 and the lower punch 72 is 180°.

Further, the upper punch surface 621 of the upper punch 62 is located above the upper end surface of the molding die 5 due to the action of the guide rail 81 of the upper die elevating mechanism 8 (that is, the upper punch surface 621 is away from the upper end surface of the molding die 5). On the other hand, the lower punch surface 721 of the lower punch 72 is located inside the molding die 5 and below the upper end surface thereof due to the action of the guide rail 91 of the lower die elevating mechanism 9.

Furthermore, the cavity 51 of the molding die 5 moves below the concave portion 121 of the molding material supply mechanism 12. At this time, the molding material supplied in the concave portion 121 drops toward the cavity 51 to be filled thereinto.

Thereafter, as shown in FIG. 5(c), the quantity of the molding material m to be filled into the cavity 51 is adjusted. In this way, the filling of the molding material m into the cavity 51 is finished.

At this time, the rotation angle of about the axis line Z of the molding die 5, the upper punch 62 and the lower punch 72 is 255°.

Further, height (vertical location) of the lower punch surface 721 of the lower punch 72 is adjusted so that the quantity of the molding material becomes a predetermined value due to the action of the guide rail 91 of the lower die elevating mechanism 9.

[A] Lower Punch Release Agent Supply Step

At the same time as the step [2], as shown in FIG. 5(c), the release agent L is supplied to the lower punch release agent holding portion 722.

More specifically, in the state that the lower punch release agent holding portion 722 is exposed outside the cavity 51, by injecting the release agent L thereto from the nozzles 201, 202, the release agent L is supplied to the lower punch release agent holding portion 722.

At this time, in this embodiment, during the step [2], the lower punch release agent holding portion 722 is exposed outside the cavity 51 from the lower opening thereof.

Further, the distal end portions of the nozzles 201, 202 face the lower punch release agent holding portion 722 and are located so as to be opposite to each other through the lower punch 72.

Given such an alignment of the nozzles 201, 202 and the lower punch 72, by injecting the release agent L from the nozzles 201, 202, the release agent is applied to the lower punch release agent holding portion 722.

Further, although an application amount of the release agent L to the lower punch release agent holding portion 722 varies depending on a configuration of the lower punch release agent holding portion 722, it is not limited to a specific vale, but is preferably substantially equal to or more than a sum volume of the plurality of concave portions 723. This makes it possible to sufficiently hold the release agent to the lower punch release agent holding portion 722 and to reliably and uniformly transfer (supply) the held release agent to the inner circumferential surface defining the cavity 51.

[3] Compression Molding Step ([D] Compression Molding Step)

Next, the molding material m filled into the cavity 51 is compression molded using the upper punch 62 and the lower punch 72.

More specifically, first, as shown in FIG. 6(a), the molding material m is preliminarily compression molded (preliminarily compressed) using the upper punch 62 and the lower punch 72.

At this time, the rotation angle about the axis line Z of the molding die 5, the upper punch 62 and the lower punch 72 is 315°.

Further, the upper die 6 (upper punch 62) and the lower die 7 (lower punch 72) are pressed so as to come close together by the action of the cams 82, 92. In this way, the molding material filled into the cavity 51 of the molding die 5 is preliminarily compression molded (preliminarily compressed).

Thereafter, as shown in FIG. 6(b), the molding material is compressed (finally compressed) by a pressure higher than that of the preliminary compression using the upper punch 62 and the lower punch 72.

At this time, the rotation angle about the axis line Z of the molding die 5, the upper punch 62 and the lower punch 72 is 360° (0°).

Further, the upper die 6 (upper punch 62) and the lower die 7 (lower punch 72) are further pressed so as to come closer together by the action of the cams 82, 92. In this way, the molding material filled into the cavity 51 of the molding die 5 is finally compression molded (finally compressed).

In this step, the pressure of the upper and lower punch surfaces 621, 721 using the cams 82, 92 is not limited to a specific vale, but is preferably in the range of 150 to 1,000 MPa, more preferably in the range of 250 to 700 MPa, and even more preferably in the range of 300 to 600 MPa.

Further, a pressing time of the upper and lower punch surfaces 621, 721 using the cams 82, 92 is not limited to a specific vale, but can be controlled by a rotation speed of the rotary table 4.

Furthermore, a processing temperature of this step is not limited to a specific value, but is preferably in the range of 15 to 30° C., more preferably in the range of 18 to 28° C., and even more preferably in the range of 20 to 25° C.

As described above, the molding material m filled into the cavity 51 is compression molded using the upper punch 62 and the lower punch 72. In this way, it is possible to obtain a molded body M.

[4] Molded Body Ejection Step

Next, as shown in FIG. 6(c), the molded body M is ejected from the cavity 51.

More specifically, first, the upper punch surface 621 is moved up above an upper end of the ejection guide 11, and the lower punch surface 721 is moved up so as to be aligned with the upper end surface of the molding die 5.

In this way, the molded body M is extruded outside the cavity 51.

In this state, the extruded molded body M makes close contact with the ejection guide 11 with the rotation of the rotary table 4, to thereby be shoved toward the predetermined area outside the rotary table 4.

In this way, the molded body M is ejected from the cavity 51.

[B] Transfer Step

At the same time as the step [4], as shown in FIG. 6(c), the release agent L held to the lower punch release agent holding portion 722 is transferred on the inner circumferential surface defining the cavity as the lower punch 72 moves inside the cavity 51 (upward).

At this time, before the molding material is filled into the cavity 51, the lower punch release agent holding portion 722, to which the release agent L has been applied, is temporarily moved so that the upper end thereof reaches in the vicinity of the upper opening of the cavity 51. In this way, the release agent L applied to the lower punch release agent holding portion 722 transfers on the inner circumferential surface defining the cavity 51.

Especially, after the ejection guide 11 is passed above the cavity 51 and before the molding material is filled into the cavity 51, it is preferred that the upper end of the region of the lower punch release agent holding portion 722, to which the release agent L has been applied, is temporarily moved in the vicinity of the upper opening of the cavity 51. This makes it possible to more reliably apply the release agent L on an upper end portion of the inner circumferential surface defining the cavity 51.

Further, this also makes it possible to omit the application of the release agent L on the inner circumferential surface defining the cavity 51 by the upper die release agent application mechanism 10. In this case, during the above mentioned step [1], the upper punch surface 621 may be aligned with (may be flush with) the upper end surface of the molding die 5, or may be located above the upper end surface of the molding die 5.

As described above, the molded body production device 1 (molded body production method of the present invention) can produce the molded body M.

Further, by repeating the above mentioned steps [1] to [4] one after another, the molded bodies M can be continuously produced. Further, in the case where the molded bodies M are continuously produced, the step [1] and the step [A] may be carried out every time or may be carried out once every several times (several rotations).

According to the molded body production device 1 (molded body production method of the present invention) as described above, it is possible to apply the release agent L to the inner circumferential surface defining the cavity 51 before the molding material m is compression molded. This makes it possible to prevent the molding material m from adhering or bonding to the inner circumferential surface defining the cavity 51. As a result, the obtained molded body M can have a high quality.

In this way, according to the molded body production device 1 of the present invention (molded body production method of the present invention), it is possible to obtain a molded body M having a high quality in excellent productivity.

<Second Embodiment>

Next, description will be made on a second embodiment of the present invention.

Figure 7:
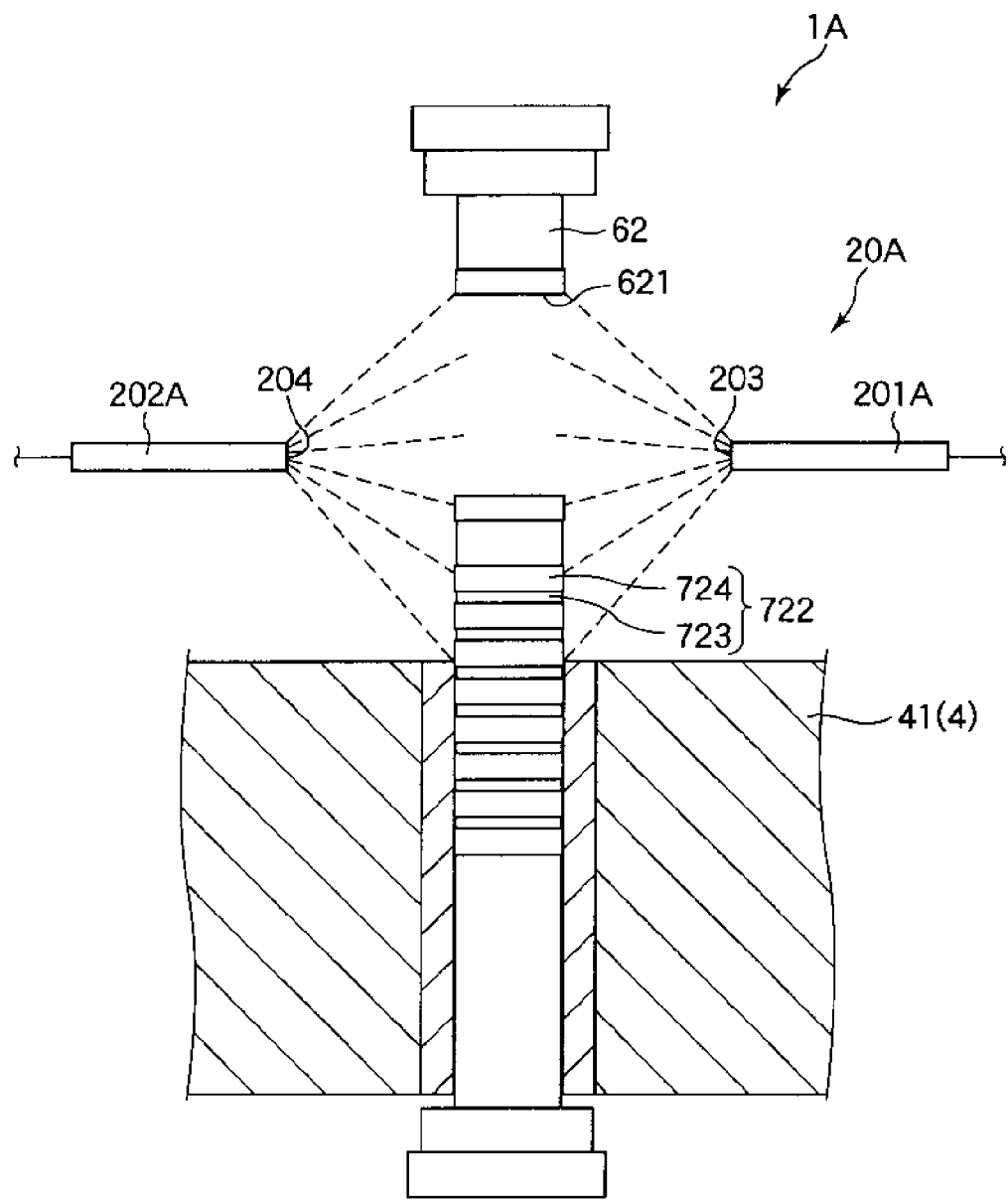
FIG. 7 is a partially enlarged sectional view showing a molded product production device according to a second embodiment of the present invention.

FIG. 7 is a partially enlarged sectional view showing a molded body production device according to the second embodiment of the present invention.

Hereinbelow, the second embodiment will be described with emphasis placed on points differing from the first embodiment. No description will be made on the same points. In this regard, it is to be noted that the same reference numbers are applied to the same components shown in FIG. 7 as those of the first embodiment.

A molded body production device 1A of this embodiment includes a lower die release agent application mechanism (lower punch release agent supply means) 20A instead of the upper die release agent application mechanism 10 and the lower die release agent application mechanism 20.

This lower die release agent application mechanism 20A supplies the release agent L to the lower punch release agent holding portion 722 when being exposed outside the cavity 51 from the upper opening thereof (above the upper end surface of the molding die 5).

As shown in FIG. 7, such a lower die release agent application mechanism (lower punch release agent supply means) 20A has two nozzles 201A, 202A.

The nozzles 201A, 202A are provided so as to be opposite to each other through near a distal end portion of the lower punch 72 exposed above the upper end surface of the molding die 5 and rotated at a predetermined rotation angle (e.g., 255°). In this regard, in this embodiment, the lower die elevating mechanism 9 of the above mentioned first embodiment only has to be controlled so that the distal end portion of the lower punch 72 is exposed above the upper end surface of the molding die 5 at the predetermined rotation angle.

At a distal end portion (distal end surface) of this nozzle 201A, a nozzle hole 203 is formed. Further, at a distal end portion (distal end surface) of this nozzle 202A, a nozzle hole 204 is formed.

Such a lower die release agent application mechanism 20A also can apply the release agent L on the inner circumferential surface defining the cavity 51.

Further, in this embodiment, even if the upper die release agent application mechanism 10 of the above mentioned first embodiment is omitted, the release agent can be applied on the upper punch surface 621, the lower punch surface 721 and the inner circumferential surface defining the cavity 51. This makes it possible to reduce the cost of the molded body production device 1A.

Further, the lower die release agent application mechanism 20A has a function of applying the release agent L to the upper punch 62. This makes it possible to prevent the molding material from adhering or bonding with respect to the upper punch 62.

Especially, the lower die release agent application mechanism 20A has a function of applying the release agent L onto each of the upper punch surface 621 and the lower punch surface 721. This makes it possible to prevent the molding material m from adhering or bonding with respect to the upper punch surface 621 and the lower punch surface 721.

The molded body production device 1A according to the second embodiment described above also can exhibit the same effects as the molded body production device 1 of the above mentioned first embodiment.

<Third Embodiment>

Figure 8:
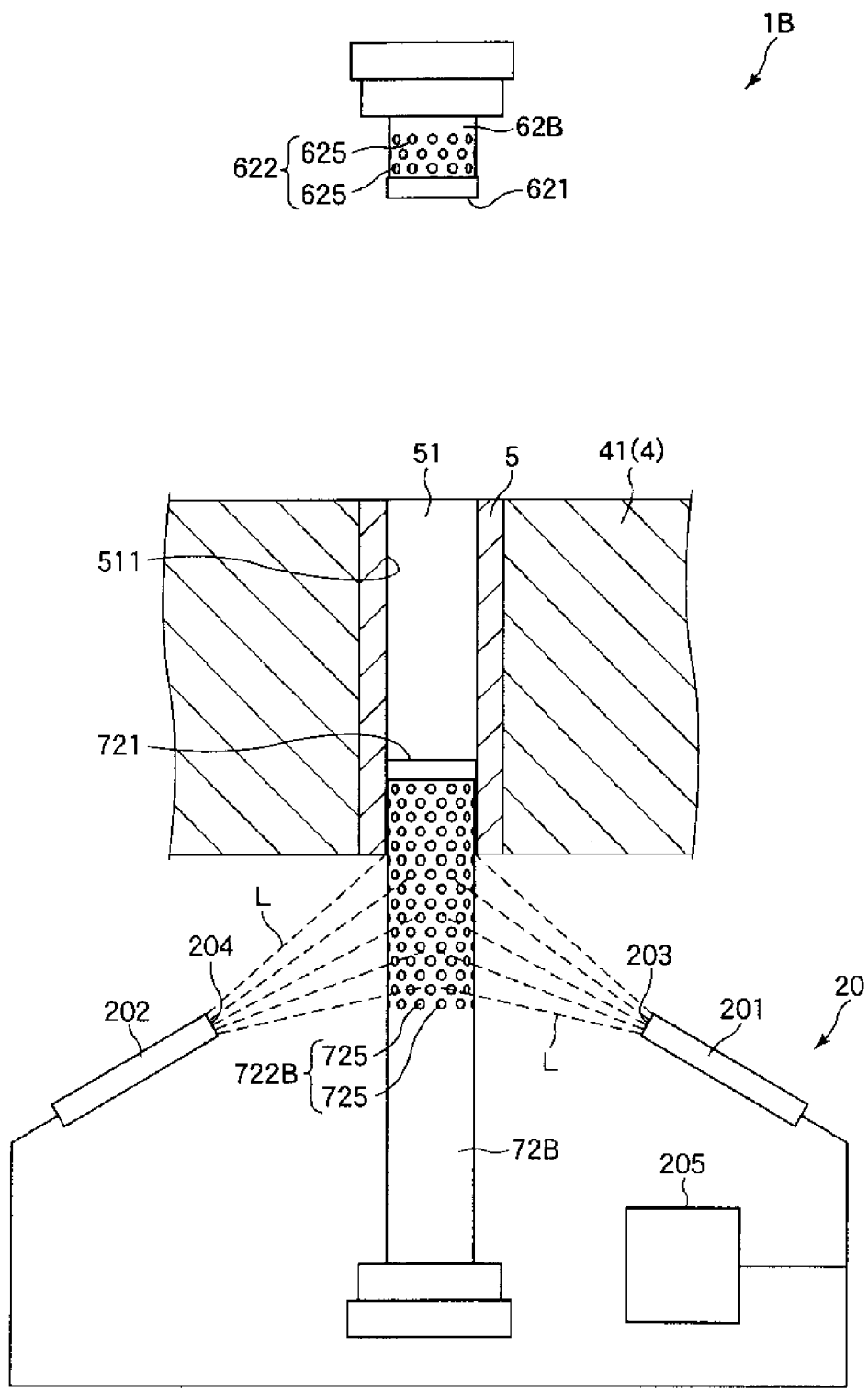
FIG. 8 is a partially enlarged sectional view showing a molded product production device according to a third embodiment of the present invention.

FIG. 8 is a partially enlarged sectional view showing a molded body production device according to a third embodiment of the present invention.

Hereinbelow, the third embodiment will be described with emphasis placed on points differing from the first embodiment. No description will be made on the same points. In this regard, it is to be noted that the same reference numbers are applied to the same components shown in FIG. 8 as those of the first embodiment.

A molded body production device 1B of this embodiment includes an upper punch 62B and a lower punch 72B.

The upper punch 62B has an upper punch release agent holding portion 622 which is provided at an upper side of the upper punch surface 621 and capable of holding the release agent L.

This upper punch release agent holding portion 622 includes a plurality of concave portions 625. Such a upper punch release agent holding portion 622 can transfer the release agent L held thereto to the inner circumferential surface defining the cavity 51 as the upper punch 62B moves inside the cavity 51 (in this embodiment, downward). This makes it possible to more reliably apply the release agent L to the upper end portion of the inner circumferential surface defining the cavity 51.

In this embodiment, each concave portion 625 is of a circular shape at a planar view thereof. The plurality of concave portions 625 are scattered on a side surface of the upper punch 62B.

Further, a cross section of each concave portion 625 may be of a shape whose width is constant from an opening side to a bottom side or may be of a triangular or semicircle shape whose width narrows from an opening side to a bottom side or the like.

To such an upper punch release agent holding portion 622, for example, the release agent is applied by the upper die release agent application mechanism 10 of the above mentioned first embodiment.

Further, the lower punch 72B has a lower punch release agent holding portion 722B which is provided at a lower side of the lower punch surface 721 and capable of holding the release agent L.

This lower punch release agent holding portion 722B includes a plurality of concave portions 725. Such a lower punch release agent holding portion 722B can transfer the release agent L held thereto to the inner circumferential surface defining the cavity 51 as the lower punch 72B moves inside the cavity 51 (in this embodiment, upward) like the lower punch release agent holding portion 722 of the above mentioned first embodiment.

In this embodiment, each concave portion 725 is constituted in the same manner as each concave portion 625 of the above mentioned upper punch release agent holding portion 622.

To such a lower punch release agent holding portion 722B, the release agent is applied by the lower die release agent application mechanism 20 of the above mentioned first embodiment.

The molded body production device 1B according to the second embodiment described above also can exhibit the same effects as the molded body production device 1 of the above mentioned first embodiment.

While the descriptions are made on the molded product production device, the molded product production method and the molded product according to the present invention based on the embodiments shown in the drawings, the present invention is not limited thereto. Each component constituting the molded body production device or the like is substituted for an arbitrary component having the same function as it. Further, arbitrary structures also may be added thereto.

For example, the components of each of the above mentioned embodiments may be combined with each other.

For example, although the lower punch release agent holding portion includes the concave portions and the convex portions, a shape of the concave portion or the convex portion is not limited to one described in the above mentioned embodiment as long as it can hold the release agent and transfer it to the inner circumferential surface defining the cavity at the time of need.

For example, the lower punch release agent holding portion may be formed on the side surface of the lower punch by a rough surface processing such as sandblast.

Further, the lower punch release agent holding portion is not limited to the structure including the concave portions and the convex portions, but may be formed by, for example, subjecting a treatment for improving a lyophilic property with respect to the release agent to the side surface of the lower punch.

Further, in the description of the above mentioned embodiments, the release agent is applied to the lower punch release agent holding portion by being injected (sprayed). However, the release agent application method is not limited thereto, but may be carried out by, for example, a method such as a dipping method, an application method using a brush, a roller or the like.

Industrial Applicability

A molded product production device of the present invention produces a molded product by compression molding a molding material. Especially, the molded product production device of the present includes a molding die having an inner circumferential surface defining a cavity with upper and lower openings, the cavity into which the molding material is to be filled, a lower punch provided so as to be inserted into the cavity from the lower opening thereof and vertically move, the lower punch having a lower punch surface and a lower punch release agent holding portion which is provided at a lower side of the lower punch surface and capable of holding a release agent, an upper punch provided so as to be inserted into the cavity from the upper opening thereof and vertically move, the upper punch having an upper punch surface; and a lower punch release agent supply means which supplies the release agent to the lower punch release agent holding portion when being exposed outside the cavity.

This makes it possible to apply the release agent onto the inner circumferential surface defining the cavity. For this reason, it is possible to prevent the molding material from adhering or bonding to the inner circumferential surface defining the cavity. As a result, the obtained molded product can have a high quality. Therefore, the present invention provides industrial applicability.

What is claimed is:

1. A molded product production device adapted to be used for producing a molded body by compression molding a molding material, comprising:
    a molding die having an inner circumferential surface defining a cavity with upper and lower openings, the cavity into which the molding material is to be filled;
    a lower punch provided so as to be inserted into the cavity from the lower opening thereof, so that the lower punch is vertically movable in the cavity, the lower punch having a lower punch surface and a lower punch release agent holding portion which is provided at a lower side of the lower punch surface and capable of holding a release agent;
    an upper punch provided so as to be inserted into the cavity from the upper opening thereof, so that the upper punch is vertically movable, the upper punch having an upper punch surface; and
    a lower punch release agent supply means which supplies the release agent to the lower punch release agent holding portion by applying a release agent solution in which the release agent is dissolved onto the lower punch release agent holding portion when the lower punch release agent holding portion is exposed outside the cavity, so that the release agent solution is applied to the inner circumferential surface of the cavity when the lower punch release agent holding portion is moved into the cavity.

2. The molded product production device as claimed in claim 1, wherein the lower punch release agent holding portion transfers the release agent held thereto to the inner circumferential surface defining the cavity as the lower punch moves inside the cavity.

3. The molded product production device as claimed in claim 1, wherein the lower punch release agent supply means supplies the release agent to the lower punch release agent holding portion when being exposed outside the cavity from the lower opening thereof.

4. The molded product production device as claimed in claim 1, wherein the lower punch release agent supply means supplies the release agent to the lower punch release agent holding portion when being exposed outside the cavity from the upper opening thereof.

5. The molded product production device as claimed in claim 1, wherein the lower punch release agent supply means includes at least one nozzle which injects the release agent toward the lower punch release agent holding portion exposed outside the cavity.

6. The molded product production device as claimed in claim 1, wherein before the molding material is filled into the cavity, the release agent is applied to the lower punch release agent holding portion, and then the lower punch is temporarily moved so that an upper end of a region of the lower punch release agent holding portion, to which the release agent has been applied, reaches in the vicinity of the upper opening of the cavity.

7. The molded product production device as claimed in claim 1, wherein the lower punch release agent holding portion includes a plurality of concave portions and/or convex portions formed on an outer circumference of the lower punch.

8. The molded product production device as claimed in claim 7, wherein each concave portion is a groove extending along the outer circumference of the lower punch in a horizontal direction.

9. The molded product production device as claimed in claim 1 further comprising an upper punch release agent supply means having a function of applying a release agent to the upper punch.

10. The molded product production device as claimed in claim 9, wherein the upper punch release agent supply means has a function of applying the release agent onto each of the upper and lower punch surfaces.

11. The molded product production device as claimed in claim 9, wherein the upper punch release agent supply means also serves as the lower punch release agent supply means.

12. The molded product production device as claimed in claim 9, wherein the upper punch further includes an upper punch release agent holding portion which is provided at an upper side of the upper punch surface and capable of holding the release agent, and
wherein the upper punch release agent supply means has a function of supplying the release agent to the upper punch release agent holding portion.

13. The molded product production device as claimed in claim 1, wherein an average thickness of the release agent applied on each of the upper punch surface, the lower punch surface and the inner circumferential surface defining the cavity is in the range of 0.001 to 50 μm.

14. The molded product production device as claimed in claim 1, wherein the molding material is of a powdered state and contains a resin material.

15. The molded product production device as claimed in claim 14, wherein the resin material comprises an epoxy-based resin material.

16. The molded product production device as claimed in claim 14, wherein the release agent contains a silicone-based release agent.

17. The molded product production device as claimed in claim 1, wherein the lower punch release agent supply means supplies the release agent to the lower punch release agent holding portion by spraying the release agent solution in which the release agent is dissolved onto the lower punch release agent holding portion when the lower punch release agent holding portion is exposed outside the cavity.

18. The molded product production device as claimed in claim 1, wherein the release agent solution is prepared by dissolving the release agent in pentane.

* * * * *